United States Patent
Nagasaki et al.

(10) Patent No.: US 11,029,558 B2
(45) Date of Patent: Jun. 8, 2021

(54) IMAGE DISPLAY APPARATUS

(71) Applicants: KYOCERA Corporation, Kyoto (JP); KYOCERA Automotive and Industrial Solutions GmbH, Dietzenbach (DE)

(72) Inventors: Koichi Nagasaki, Yasu (JP); Seiichi Karatsu, Otsu (JP); Manfred Sauer, Dietzenbach (DE); Matthias Neundorf, Dietzenbach (DE)

(73) Assignees: KYOCERA CORPORATION, Kyoto (JP); KYOCERA AUTOMOTIVE AND INDUSTRIAL SOLUTIONS GMBH, Dietzenbach (DE)

( * ) Notice: Subject to any disclaimer, the term of this patent is extended or adjusted under 35 U.S.C. 154(b) by 81 days.

(21) Appl. No.: 16/345,293

(22) PCT Filed: Feb. 24, 2017

(86) PCT No.: PCT/JP2017/007258
§ 371 (c)(1),
(2) Date: Apr. 26, 2019

(87) PCT Pub. No.: WO2018/083817
PCT Pub. Date: May 11, 2018

(65) Prior Publication Data
US 2019/0258112 A1 Aug. 22, 2019

(30) Foreign Application Priority Data
Nov. 7, 2016 (JP) .............................. JP2016-217653

(51) Int. Cl.
*G02F 1/13357* (2006.01)
*G02F 1/1333* (2006.01)
*G02F 1/1335* (2006.01)
*G06F 9/00* (2006.01)
*B60R 11/00* (2006.01)
*G09F 9/00* (2006.01)

(52) U.S. Cl.
CPC ...... *G02F 1/133602* (2013.01); *G02F 1/1333* (2013.01); *G02F 1/133305* (2013.01);
(Continued)

(58) Field of Classification Search
CPC ......... G02F 1/133308; G02F 1/133512; G02F 1/133602; G02F 1/1333; G02F 1/133305;
(Continued)

(56) References Cited

U.S. PATENT DOCUMENTS 8,896,800 B2 * 11/2014 Park ...................... G02F 1/1339
349/153
2006/0268190 A1 * 11/2006 Yu ...................... G02F 1/133608
349/58

(Continued)

FOREIGN PATENT DOCUMENTS

JP 2003-087811 A 3/2003
JP 2007-163816 A 6/2007
(Continued)

*Primary Examiner* — Jessica M Merlin
(74) *Attorney, Agent, or Firm* — Volpe Koenig

(57) ABSTRACT

An image display apparatus includes a liquid crystal display panel including a display surface for displaying an image; an imaging device disposed face a back surface of the liquid crystal display panel, the back surface located opposite to the display surface, the imaging device being capable of imaging a front area of the liquid crystal display panel; and a backlight device which retains the imaging device in a location behind the back surface of the liquid crystal display panel, and applies light to the back surface of the liquid crystal display panel. The imaging device includes a sleeve including a cylindrical third sleeve which receives therein a lens, and an annular light shield member is mounted between the back surface and an end surface of the third sleeve and is in contact with each of the back surface and the end surface.

7 Claims, 17 Drawing Sheets

(52) U.S. Cl.
CPC .. *G02F 1/133308* (2013.01); *G02F 1/133512* (2013.01); *G02F 1/133553* (2013.01); *G09F 9/00* (2013.01); *B60R 2011/0005* (2013.01); *B60R 2300/8006* (2013.01); *G02F 1/1336* (2013.01)

(58) Field of Classification Search
CPC .... G02F 1/133553; G02F 1/1336; G09F 9/00; B60R 2011/0005; G60R 2300/8006
See application file for complete search history.

(56) References Cited

U.S. PATENT DOCUMENTS

| | | | |
|---|---|---|---|
| 2009/0009628 A1 | 1/2009 | Janicek | |
| 2011/0261283 A1* | 10/2011 | Kim | G03B 29/00 349/58 |
| 2015/0261033 A1* | 9/2015 | Shin | H05K 5/0086 349/58 |
| 2017/0176787 A1* | 6/2017 | Jia | G02F 1/133308 |

FOREIGN PATENT DOCUMENTS

| | | |
|---|---|---|
| JP | 2011-020669 A | 2/2011 |
| JP | 2011-504242 A | 2/2011 |
| JP | 2012-098726 A | 5/2012 |
| JP | 5643173 B2 | 12/2014 |
| JP | 5740012 B2 | 6/2015 |
| JP | 5884248 B2 | 3/2016 |
| KR | 10-2014-0030704 A | 3/2014 |
| WO | 2010/050012 A1 | 5/2010 |

\* cited by examiner

IMAGE DISPLAY APPARATUS

CROSS-REFERENCE TO RELATED APPLICATIONS

This application is a national stage entry according to 35 U.S.C. 371 of International Application No. PCT/JP2017/007258 filed on Feb. 24, 2017, which claims priority to Japanese Patent Application No. 2016-217653 filed on Nov. 7, 2016, the contents of which are entirely incorporated herein by reference.

TECHNICAL FIELD

The present disclosure relates to an image display apparatus equipped with an imaging device.

BACKGROUND

An image display apparatus equipped with an imaging device, being called a camera built-in display apparatus, is known as mobile communications equipment such as a smartphone and a camera-equipped mobile phone. Such an image display apparatus according to the related art is shown in Patent Literature 1.

In this configuration according to the related art, as shown in FIG. 7 of Patent Literature 1, in a camera serving as an imaging device, image light is condensed by a lens array with a plurality of lens elements, and, the lens array brings the image light into focus onto a solid-state imaging element. As shown in FIG. 6 of Patent Literature 1, all the lens elements constituting the lens array are mounted in a stacked arrangement so as to lie below an opening of ink applied onto the lower surface of a cover glass layer.

The above-described camera is mounted at the back surface of part of the cover glass layer of the image display apparatus in a mobile phone. Black ink is printed to the back surface of the cover glass to obscure the camera when viewed from outside, and the black ink is formed with an opening as a window to ensure the field of view of the camera. Unfortunately, the camera is disposed away from an image display region including a region which is irradiated with light from a backlight device, that is, the image display region is out of sight of the camera.

Moreover, as shown in FIG. 9 of Patent Literature 1, the image display apparatus disclosed in Patent Literature 1 includes a display section including a polarizer provided with an opening, a thin-film transistor layer, and a color filter layer; a sleeve placed so as to pass through the opening; a camera with a lens structure which is, at least partly, stored within the sleeve; and a glass layer attached to the display section.

In the proposed configuration according to the related art, the glass layer has an opening through which the lens structure and the sleeve are allowed to pass, and, the color filter layer and the thin-film transistor layer, each including an edge, are stacked so that the edge of the color filter layer is located farther backward than the edge of thin-film transistor layer. A projection for the attachment of the glass layer is formed in the edge of the thin-film transistor layer.

Moreover, a cut-out portion conforming to the projection formed in the thin-film transistor layer is formed in the edge of the color filter layer, and, the glass layer includes a fit layer attached to the projection. The lens structure is only partly fitted to the glass layer. Other examples of the related art similar to that embodying the image display apparatus of Patent Literature 1 are shown in Patent Literatures 2 and 3.

Another example of the related art is shown in Patent Literature 4. A proposed configuration according to this example of the related art is an image display apparatus in which, with repeated cycles of an active mode of showing an image on a display surface and an non-active mode of darkening a display element while rendering it transparent in part, in the non-active mode, an image-capturing mechanism in the form of an imaging device disposed at the back of the display surface performs image capturing via the display surface to take a photo image of an object located ahead of the display surface.

Still another example of the related art is shown in Patent Literatures 5 and 6. A proposed configuration according to this example of the related art is a vehicle-mounted camera module that performs imaging by operating an imaging element in a manner to capture a vehicle interior image and a vehicle exterior image seen in a mirror, detects driver's drowsy driving and inattentive driving on the basis of the running conditions of the vehicle and driver's conditions to give warning of danger, senses an object which jumped out on the road or the area between the vehicle and the one ahead to give warning of danger if necessary, and serves as a dashboard camera to obtain image data about driver's conditions, vehicle conditions, road conditions, etc. that is useful as circumstantial evidence in the event of an accident.

Still another example of the related art is shown in Patent Literature 7. A configuration according to this example of the related art is an image display apparatus, which is described as a display structure, including a liquid crystal display panel including a glass substrate provided with a hole formed therethrough for the insertion of a camera. In the display structure, a hole is formed through a glass substrate equipped with many thin film transistors (TFTs for short), and, a camera is fitted in this through hole.

Yet another example of the related art is shown in Patent Literature 8. A configuration according to this example of the related art is an image display apparatus configured so that, as is understood from Claim 1 and FIG. 4b, a light shield is disposed around a camera at a light guide, viz., a light guide plate of a backlight device, and, the light guide plate and the camera are integral with each other.

CITATION LIST

Patent Literature

Patent Literature 1: Japanese Examined Patent Publication JP-B2 5884248
Patent Literature 2: Japanese Examined Patent Publication JP-B2 5643173
Patent Literature 3: Japanese Examined Patent Publication JP-B2 5740012
Patent Literature 4: US 2009/0009628 A1
Patent Literature 5: WO 2010/050012 A1
Patent Literature 6: Japanese Unexamined Patent Publication JP-A 2011-20669
Patent Literature 7: Japanese Unexamined Patent Publication JP-A 2012-98726
Patent Literature 8: Japanese Unexamined Patent Publication JP-A 2011-504242

SUMMARY

Technical Problem

The above-described examples of the related art shown in Patent Literatures 1 to 3 entail complicated working and assembly operation, such as the process of forming an opening of complex shape in the specially-configured glass layer with TFT functions, and also the formation of the fit layer and so forth in the glass layer. This gives rise to high manufacturing cost and poor manufacturability.

The above-described example of the related art shown in Patent Literature 4, while enabling taking of a photo image of an object located ahead of the display surface by operating the image-capturing mechanism in the form of an imaging device disposed at the back of the display surface, gives no regard to arrangement for mounting the image-capturing mechanism within the apparatus. That is, this example of the related art is not intended to propose the technique of making the image display apparatus compact and lower in profile.

The above-described examples of the related art shown in Patent Literatures 5 and 6, while allowing the imaging element to take a vehicle interior image and a vehicle exterior image seen in a mirror, are not intended to propose the technique of making the image display apparatus compact and lower in profile.

Furthermore, in the above-described example of the related art shown in Patent Literature 7, the TFT needs to be formed in a location away from the through hole-forming area, and there is also a need to prevent leakage of liquid crystal out of the through hole, for example, the formation of a preventive layer for prevention of liquid crystal leakage is necessary. This leads to structural complexity, poor assembly workability, and an increase in manufacturing cost. Compounding the problem, due to lack of a light shield mechanism for preventing the entry of light from the backlight device into the camera, when the light from the backlight device exhibits high intensity, the light from the backlight device enters the camera, causing failure of the apparatus to obtain appropriate image light.

The above-described example of the related art shown in Patent Literature 8 falls short of blocking light from the light guide. Especially when using an ultrabright backlight device set for a light intensity level of about 20000 candela, the light which has been emitted from the backlight device and diffusely reflected from the liquid crystal panel may enter the camera easily.

An object of the present disclosure is to provide an image display apparatus which has excellent assemblability in manufacture by simplifying configuration, is capable of achieving size reduction and thickness reduction. Another object of the present disclosure is to provide an image display apparatus equipped with an imaging device having high shield capability against light from a backlight device.

Solution to Problem

The present disclosure provides an image display apparatus comprising a liquid crystal display panel including a display surface for displaying an image, on a first surface of the liquid crystal display panel; an imaging device disposed to face a second surface of the liquid crystal display panel, the second surface located opposite to the first surface, the imaging device being capable of imaging a front area of the liquid crystal display panel, and including a sleeve and an imaging element which receives incoming light which has passed through the sleeve; a backlight device disposed to face the second surface of the liquid crystal display panel, the backlight device applying light to the second surface of the liquid crystal display panel and including a retaining portion to hold the imaging device; and a light shield member, the light shield member having an annular shape, being disposed between the second surface of the liquid crystal display panel and an end surface of the sleeve, and being in contact with each of the second surface and the end surface.

In the present disclosure, it is preferable that the light shield member is made of an elastic material.

Moreover, in the present disclosure, it is preferable that the light shield member is fastened to the end surface of the sleeve and is in contact with the second surface of the liquid crystal display panel such that a biasing force is applied to the second surface of the liquid crystal display panel.

Moreover, in the present disclosure, it is preferable that the retaining portion includes a tubular body which surrounds the imaging device.

Moreover, in the present disclosure, it is preferable that the image display apparatus further includes a protective member having a plate-like shape, covering the display surface of the liquid crystal display panel, and including a first light transmitting portion and a second light transmitting portion which is lower in light transmittance than the first light transmitting portion, and that the imaging device is aligned with the second light transmitting portion.

Moreover, in the present disclosure, it is preferable that the image display apparatus further includes an infrared generating portion located in the imaging device, the infrared generating portion emitting infrared light toward the liquid crystal display panel.

Moreover, in the present disclosure, it is preferable that the image display apparatus further includes a power supply which is shared by the imaging device and the backlight device, and an operation controller which operates the liquid crystal display panel in conjunction with the imaging device by inputting an operation signal of the imaging device to the liquid crystal display panel.

Advantageous Effects

According to the present disclosure, the imaging device is retained by the backlight device in a location behind the back surface of the liquid crystal display panel. The imaging device includes the tubular sleeve in which a lens is received, and also includes the annular light shield member disposed between the back surface of the liquid crystal display panel and the end surface of the sleeve. With this arrangement, it is possible to avoid that light from the backlight device and the resulting reflected light enter the imaging device and consequently the imaging device receives the light from the backlight device. Thus, even when image taking is performed during the time the backlight device stays on, that is, the liquid crystal display panel stays in an image-displaying condition, an adequate amount of light exposure is achieved, and in consequence, troubles such as image taking failure are prevented.

Thus, the imaging device is retained by the backlight device while being free of the entry of light from the backlight device. This makes it possible to eliminate the need to form a cut-out portion or through opening in the liquid crystal display panel to install the imaging device with a consequent increase in structural complexity, and thereby accomplish the installation of the imaging device with simple arrangement. Thereby, the image display apparatus which has excellent assemblability in manufacture by simplifying configuration, is capable of achieving size reduction and thickness reduction can be implemented.

Moreover, according to the present disclosure, in the case where the light shield member is made of an elastic material, it is possible to enhance the adherability of the light shield member to the back surface of the liquid crystal display panel and the end surface of the sleeve, and thereby reduce the occurrence of a gap through which light penetrates and consequently prevent the entry of light into the imaging device more securely. Since the light shield member is made of an elastic material, occurrence of display failure due to generation of extra stress in the liquid crystal display panel is prevented.

Moreover, according to the present disclosure, in the case where the light shield member is fastened to the end surface of the sleeve and contacts the back surface of the liquid crystal display panel such that a biasing force is applied to the second surface of the liquid crystal display panel, the light shield member is not fastened to the back surface of the liquid crystal display panel, and is thus allowed to move with flexibility. Consequently, occurrence of display failure due to generation of extra stress in the liquid crystal display panel is prevented.

Moreover, according to the present disclosure, the retaining portion includes a tubular body which surrounds the imaging device. In this case, light from the backlight device is blocked by the tubular body, so that direct or indirect entry of the light from the backlight device into the imaging device can be prevented. Moreover, forming the retaining portion as the tubular body which surrounds the imaging device facilitates the positioning of the imaging device, and thus improves the mountability of the imaging device to the backlight device.

Moreover, according to the present disclosure, in the case where the protective member having a plate-like shape covers the display surface of the liquid crystal display panel, this protective member includes the first light transmitting portion and the second light transmitting portion which is lower in light transmittance than the first light transmitting portion, and the imaging device is aligned with the second light transmitting portion, it is possible to reduce the entry of reflected light, which results from the reflection of light from the backlight device by the protective member, into the imaging device, as well as to obscure the imaging device when viewed from outside by an observer.

Moreover, according to the present disclosure, in the case where the imaging device is provided with the infrared generating portion, it is possible to apply infrared light from the infrared generating portion to the object to be photographed, and thereby enable image taking in the dark.

Moreover, according to the present disclosure, in the case where the image display apparatus includes the power supply which is shared by the imaging device and the backlight device, and the operation controller which operates the liquid crystal display panel in conjunction with the imaging device by the inputting an operation signal of the imaging device to the liquid crystal display panel, it is possible to implement the downsized, low-profile image display apparatus equipped with the imaging device in the form of a camera built-in display apparatus at low cost with facility. In addition, for example, under the control of the operation controller, a part of the liquid crystal display panel which corresponds to the position of the imaging device can be brought to a light-transmittable state during image taking operation of the imaging device. This facilitates the image taking operation.

BRIEF DESCRIPTION OF DRAWINGS

The objects, features, and advantages of the present disclosure will become more apparent by reference to the following detailed description in conjunction with the accompanying drawings.

DETAILED DESCRIPTION

Figure 1:
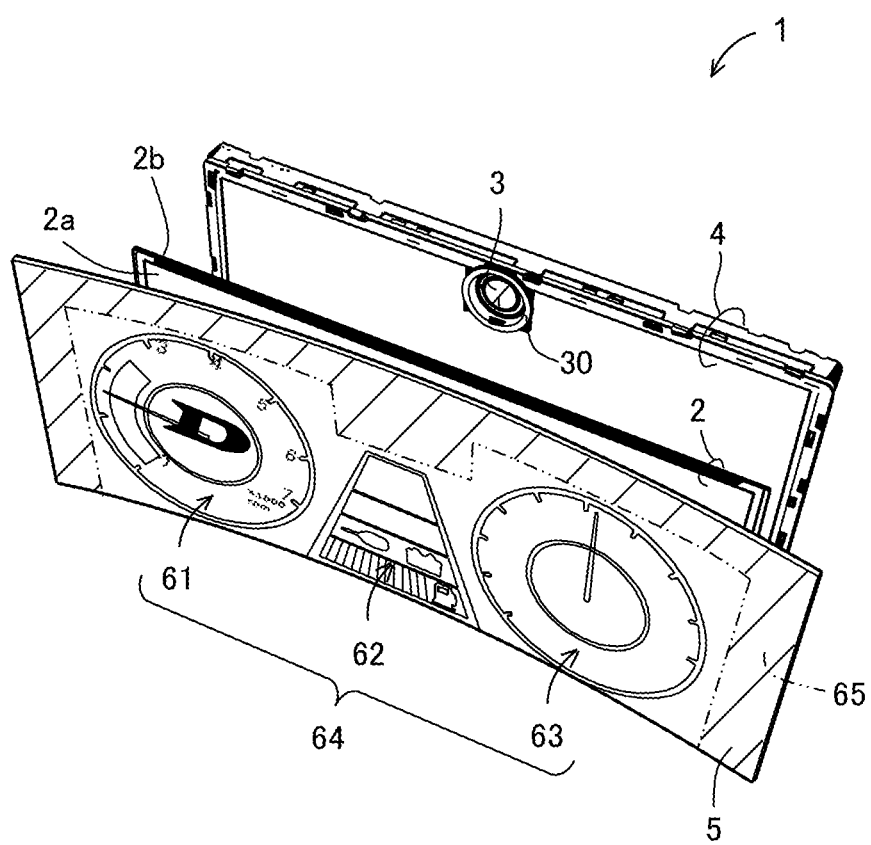
FIG. 1 is an exploded perspective view showing an image display apparatus in accordance with an embodiment of the present disclosure.
Figure 2:
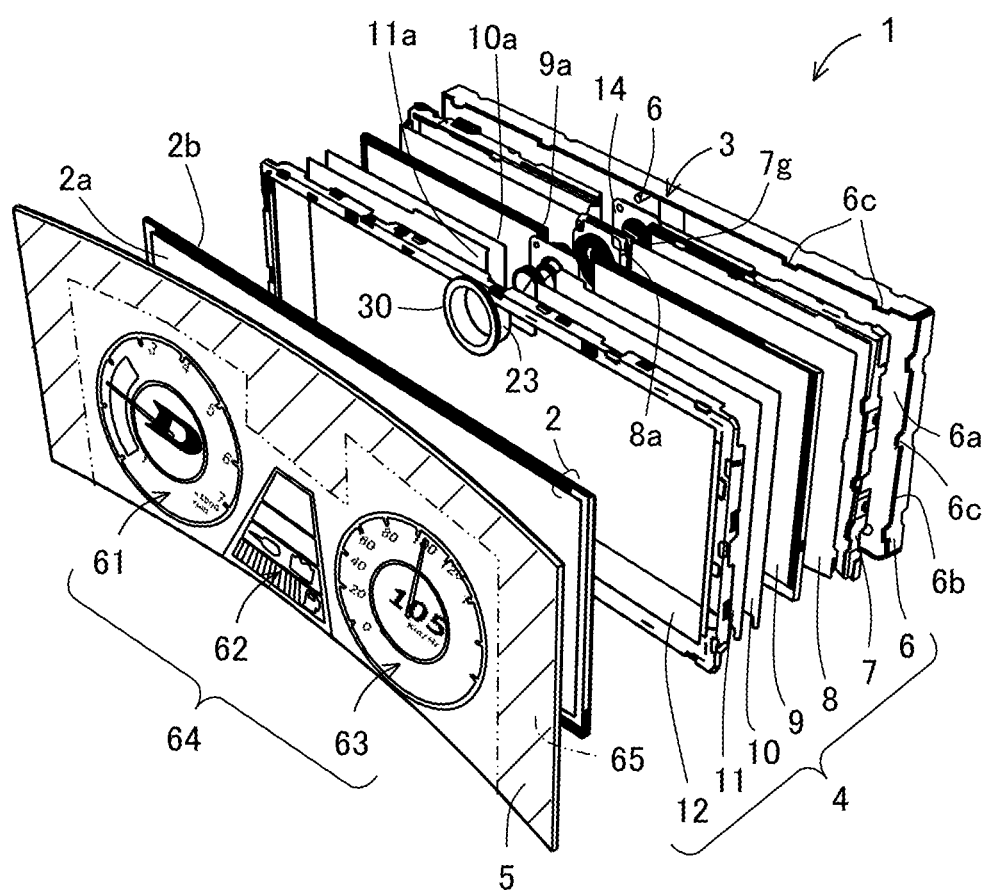
FIG. 2 is an exploded perspective view of the image display apparatus, with a backlight device shown in FIG. 1 illustrated as being in a disassembled state.
Figure 3:
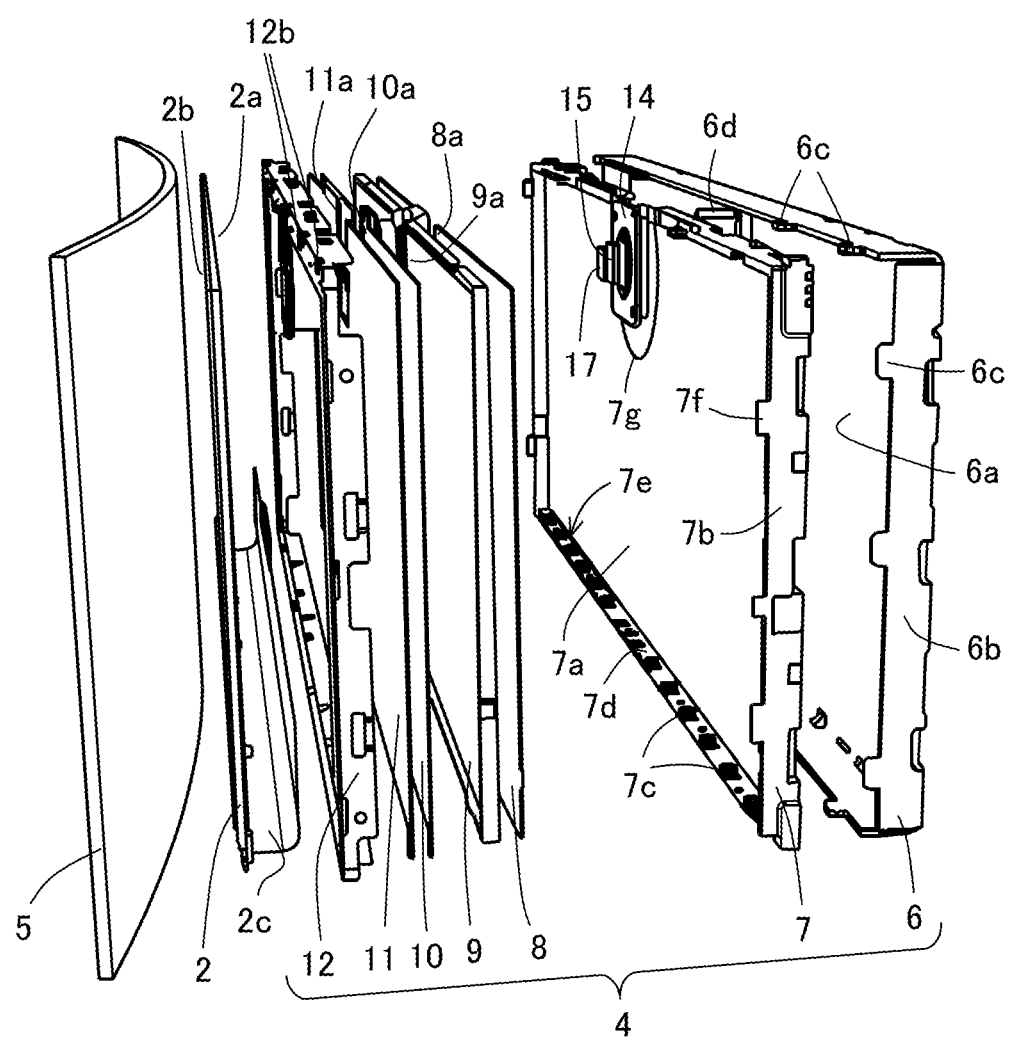
FIG. 3 is an exploded perspective view of the image display apparatus as seen from the side.

FIG. 1 is an exploded perspective view showing an image display apparatus 1 in accordance with an embodiment of the present disclosure. FIG. 2 is an exploded perspective view of the image display apparatus 1, in which a backlight device 4 as shown in FIG. 1 is illustrated as being in a disassembled state. FIG. 3 is an exploded perspective view of the image display apparatus 1 as seen from the side. The image display apparatus 1 according to the embodiment includes a liquid crystal display panel 2 including a display surface 2a for displaying an image on a first surface of the liquid crystal display panel 2; an imaging device 3 disposed to face a back surface 2b which is a second surface of the liquid crystal display panel 2, the second surface located opposite to the display surface 2a, the imaging device 3 being capable of imaging a front area of the liquid crystal display panel 2; and a backlight device 4 which retains the imaging device 3 in a location behind the back surface 2b of the liquid crystal display panel 2, and applies light to the back surface 2b of the liquid crystal display panel 2, and preferably, further includes a cover panel 5 in the form of a plate-like protective member covering the display surface 2a of the liquid crystal display panel 2. As shown in FIG. 3, the liquid crystal display panel 2 includes, at a lower end thereof, a circuit board 2c including a driving element such as IC for display drive control, a flexible printed circuits (FPC) with a circuit wiring, and so forth.

The backlight device 4 includes a chassis 6 made of metal such as an aluminum alloy, or synthetic resin; a tray 7 fitted in the chassis 6; a reflective sheet 8; a light guide plate 9 made of light-transmittable synthetic resin such as polycarbonate; a diffusing sheet 10; a brightness enhancement film 11; and a frame body 12.

The chassis 6 includes a bottom plate 6a formed of a plate-like body shaped in a horizontally oriented rectangle as seen in a front view; and four side walls 6b each merging in a vertically standing condition with the corresponding one of four sides of the bottom plate 6a. A plurality of projections 6c are formed in each side wall 6b.

The frame body 12, which is shaped in a horizontally oriented rectangle whose sides are in a one-to-one correspondence with the side walls 6b of the chassis 6 as seen in a front view, includes four frame portions 12a each formed of a narrow elongate plate-like body having substantially the same length as that of the corresponding one of the side walls 6b. Each frame portion 12a is provided with a plurality of slits 12b, in each of which the corresponding one of the projections 6c of the chassis 6 and projections 7f of the tray 7 engages as described later.

The tray 7 includes a bottom plate 7a shaped in a horizontally oriented rectangle as seen in a front view; and four side walls 7b each merging in a vertically standing condition with the corresponding one of four sides of the bottom plate 7a. The inner surface of the lower side wall 7b includes a light-emitting element array substrate 7e in which a narrow elongate substrate 7d bears a plurality of light-emitting elements 7c arranged in a plurality of rows as light sources. A plurality of projections 7f are formed in each side wall 7b.

The tray 7 receives therein the reflective sheet 8, the light guide plate 9, the diffusing sheet 10, and the brightness enhancement film 11 described above that are stacked in the order named. The frame body 12 is fitted into the tray 7, with the projections 6c of the chassis 6 and the projections 7f of the tray 7 fixedly engaging in the corresponding slits 12b. In a state where the light guide plate 9 is set in the tray 7, the lower surface of the light guide plate 9 corresponds to the light-emitting element array substrate 7e so that light from each light-emitting element 7c mounted on the light-emitting element array substrate 7e enters through the lower surface of the light guide plate 9.

Figure 4:
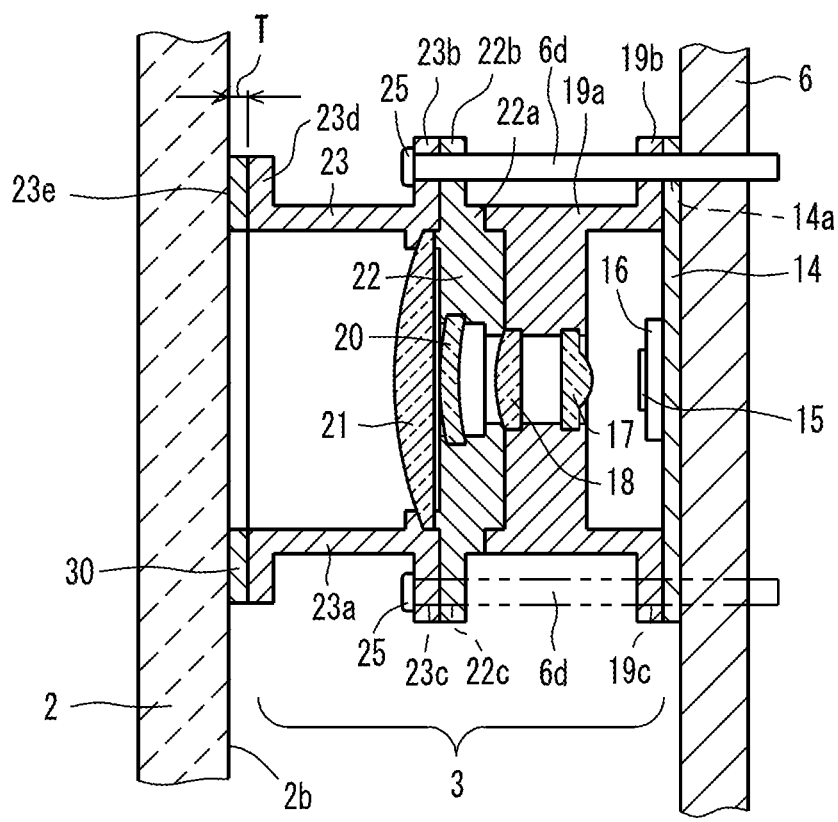
FIG. 4 is fragmentary sectional view for explaining how an imaging device is to be attached to the backlight device.
Figure 5:
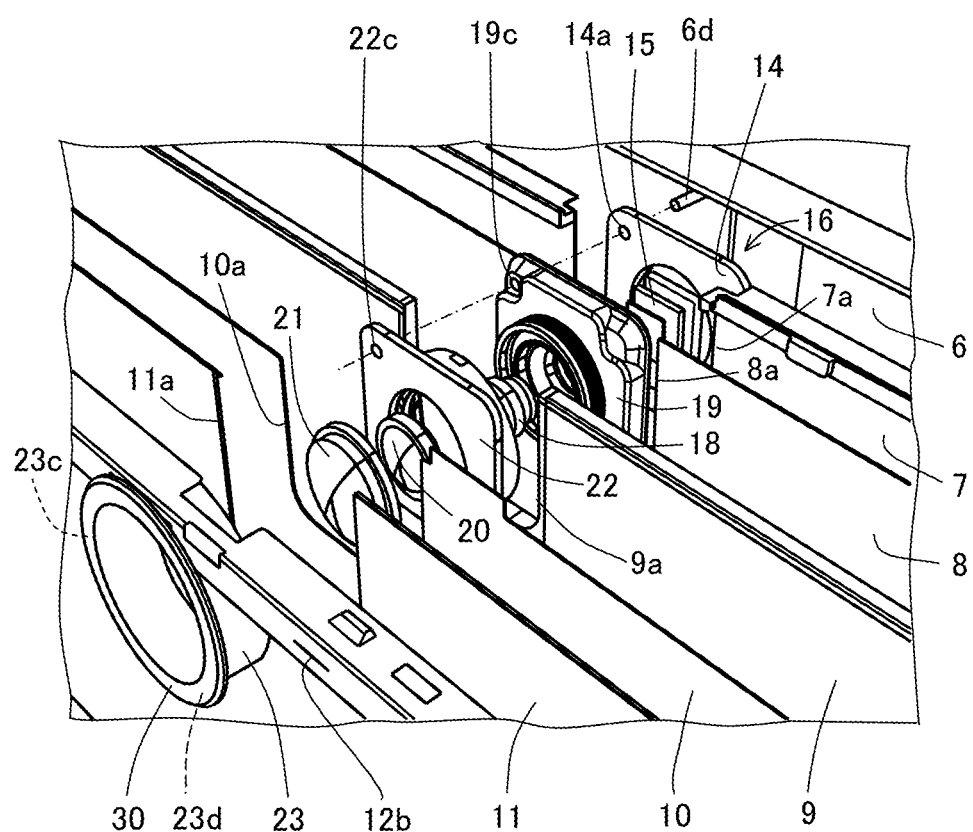
FIG. 5 is an exploded perspective view of the imaging device.

FIG. 4 is fragmentary sectional view for explaining how the imaging device 3 is to be attached to the backlight device 4, and, FIG. 5 is an exploded perspective view of the imaging device 3. The imaging device 3 includes a substrate 14 with an imaging element substrate 16 bearing an imaging element 15 such for example as a CMOS (Complementary Metal-Oxide Semiconductor) image sensor. Moreover, the imaging device 3 includes a first lens 17, a second lens 18, and a first sleeve 19 which receives therein the first lens 17 and the second lens 18. The imaging device 3 further includes a third lens 20 and a second sleeve 22 which receives therein the third lens 20. In addition, the imaging device 3 includes a fourth lens 21 and a third sleeve 23. The fourth lens 21 is held between the second sleeve 22 and the third sleeve 23. The first sleeve 19, the second sleeve 22, and the third sleeve 23 constitute a tubular sleeve in which the lenses are received.

The first sleeve 19 includes a substantially cylindrical tubular portion 19a; and a flange 19b which merges with one end in an axial direction of the tubular portion 19a, extends radially outwardly, and is substantially square-shaped as seen in a front view. The second sleeve 22 includes a substantially cylindrical tubular portion 22a; and a flange 22b which merges with one end in an axial direction of the tubular portion 22a, extends radially outwardly, and is substantially square-shaped as seen in a front view. The third sleeve 23 includes a substantially cylindrical tubular portion 23a; a first flange 23b which merges with one end in an axial direction of the tubular portion 23a and extends radially outwardly; and a second flange 23d which merges with the other end in the axial direction of the tubular portion 23a and extends radially outwardly.

The chassis 6 includes a pair of columnar projections 6d formed in a vertically upstanding condition on the bottom plate 6a. The substrate 14 is formed of a plate-like insulating substrate having a substantially quadrangular shape as seen in a front view. In the substrate 14, a pair of through openings 14a are formed so as to align on one of two diagonal lines. Likewise, the flange 19b of the first sleeve 19 includes a pair of through openings 19c formed so as to align on one of two diagonal lines. The flange 22b of the second sleeve 22 includes a pair of through openings 22c formed so as to align on one of two diagonal lines. The first flange 23b of the third sleeve 23 includes a pair of through openings 23c formed so as to align on one of two diagonal lines.

With respect to the first to third sleeves 19, 22, and 23, in a state where the first to fourth lenses 17, 18, 20, and 21 are received in the frame body 12 together with the substrate 14, the projection 6d is inserted into the through opening 14a of the substrate 14 and the through opening 19c of the first sleeve 19, the shaft of a bolt 25 is inserted into the through opening 22c of the second sleeve 22 and the through opening 23c of the third sleeve 23, and then the shaft is threadedly engaged in a screw hole formed in the projection 6d and fastened. Thus, the imaging device 3 is secured to the bottom plate 6a of the chassis 6.

To avoid interference with the imaging device 3 secured to the bottom plate 6a, the tray 7, the reflective sheet 8, the light guide plate 9, the diffusing sheet 10, and the brightness enhancement film 11 are provided with open-topped cut-out portions 7g, 8a, 9a, 10a, and 11a, respectively. The cover panel 5 is formed of a plate-like body whose shape is defined by part of a circular cylinder, that is, the cover panel 5 is convexly curved with substantially uniform curvature toward the liquid crystal display panel 2.

Figure 6:
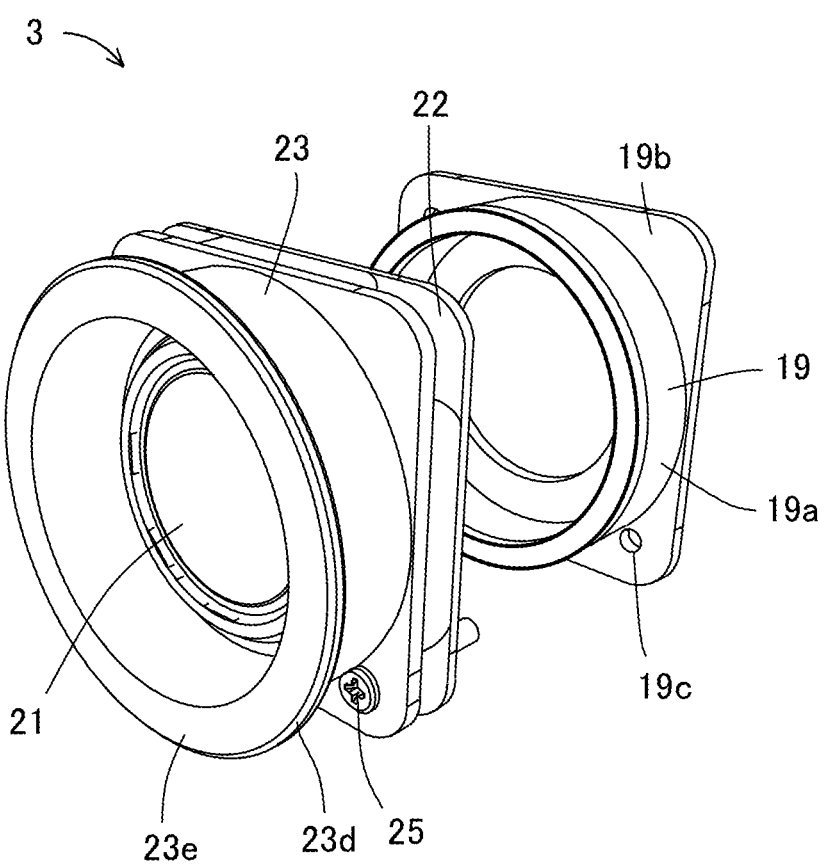
FIG. 6 is an external perspective view of the imaging device free of a light shield member.
Figure 7:
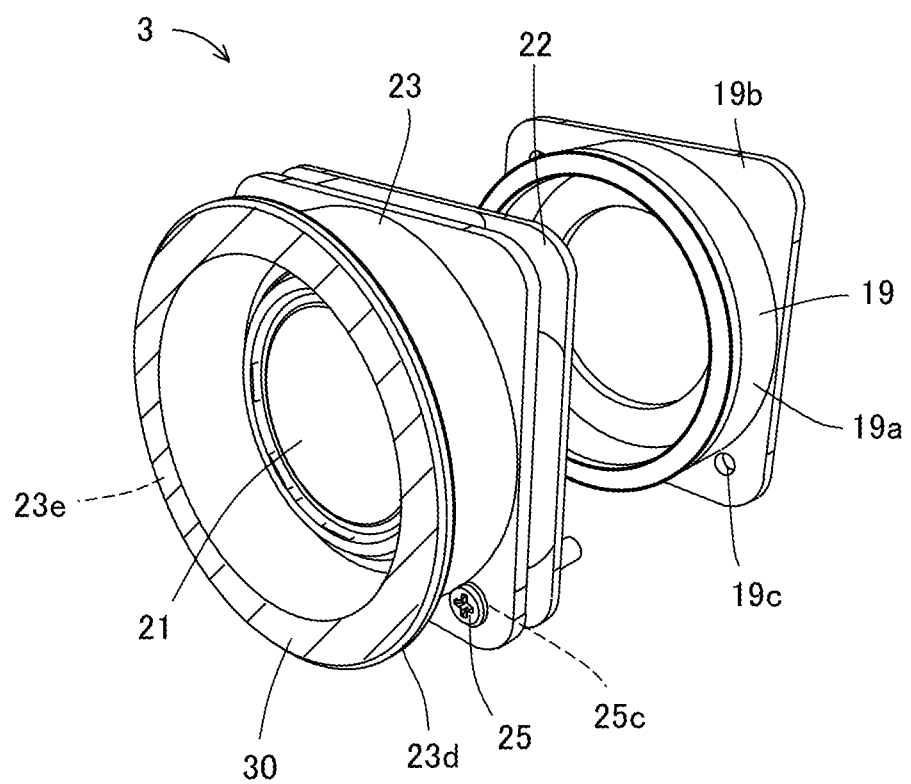
FIG. 7 is an external perspective view of the imaging device including the light shield member.
Figure 11:
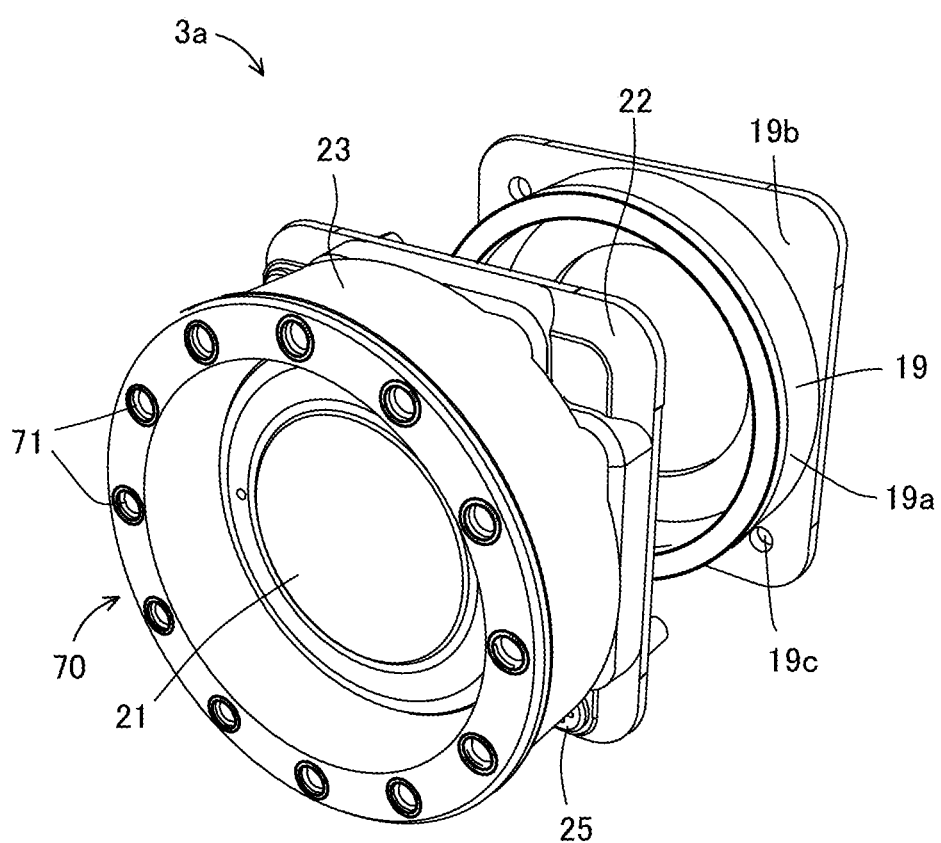
FIG. 11 is a perspective view showing the imaging device for use in the image display apparatus in accordance with another embodiment of the present disclosure.

FIG. 6 is an external perspective view of the imaging device 3 free of a light shield member 30, whereas FIG. 7 is an external perspective view of the imaging device 3 provided with the light shield member 30. The third sleeve 23 includes the radially outwardly extending second flange 23d merging with the other end in the axial direction of the tubular portion 23a. In the third sleeve 23, the annular light shield member 30 (indicated by the diagonally shaded area in FIG. 7) is located between the back surface 2b of the liquid crystal display panel 2 and an end surface 23e of the second flange 23d opposed to the back surface 2b. The light shield member 30 is preferably made of an elastic material and is mounted in contact with the back surface 2b and the end surface 23e. This makes it possible to reduce the occurrence of a gap which through which light penetrates, and thereby prevent the entry of light into the imaging device 3 more securely. The light shield member 30 of the present disclosure blocks at least visible light. For example, as shown in FIG. 11, the light shield member 30 includes a light shield member which blocks visible light and yet allows infrared light to pass therethrough. Thus, the light shield member 30 of the present disclosure may be configured to block both visible light and infrared light.

In the present embodiment, the light shield member 30 is adhesively or otherwise fastened to the end surface 23e of the third sleeve 23, and is movably kept in contact with the back surface 2b of the liquid crystal display panel 2 such that a biasing force is elastically applied to the back surface 2b of the liquid crystal display panel 2. In this case, while the light shield member 30 is fastened to the end surface 23e of the third sleeve 23, examples of fastening include bonding using an adhesive or the like and adhesion using a sticky sheet, that is, a state where the light shield member 30 can be pulled off by an external force of a certain level or above. As the elastic material, it is possible to use an elastic body of high-weather and impact-resistant synthetic resin which blocks light, such as silicone resin. In the interests of sufficiently high light-blocking effect and impact-lessening effect, for example, a thickness T of the light shield member 30 falls preferably within the range of 1 mm to 2 mm, or more preferably within the range of 0.1 mm to 1 mm. When the thickness of the light shield member 30 is less than 0.1 mm, the liquid crystal display panel 2 may be susceptible to undesirable stress, causing unevenness in display. When the thickness of the light shield member 30 exceeds 2 mm, the degree of accuracy for the positioning of the imaging device 3 may be decreased, and also downsizing of the image display apparatus 1 may not be successfully achieved.

Figure 8:
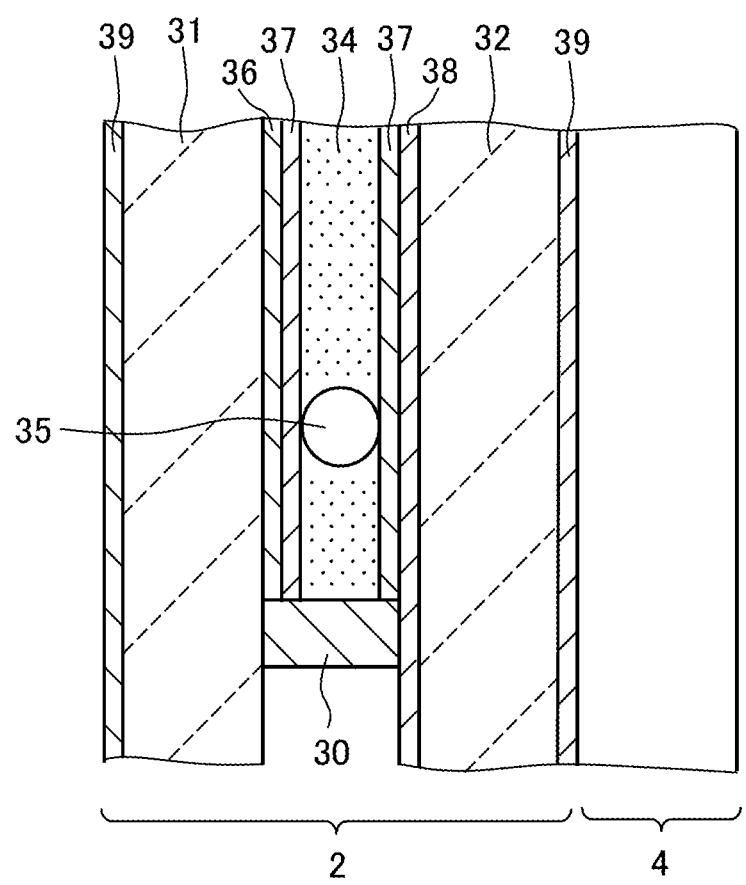
FIG. 8 is an enlarged sectional view showing part of a passive matrix liquid crystal display panel and the backlight device.
Figure 9:
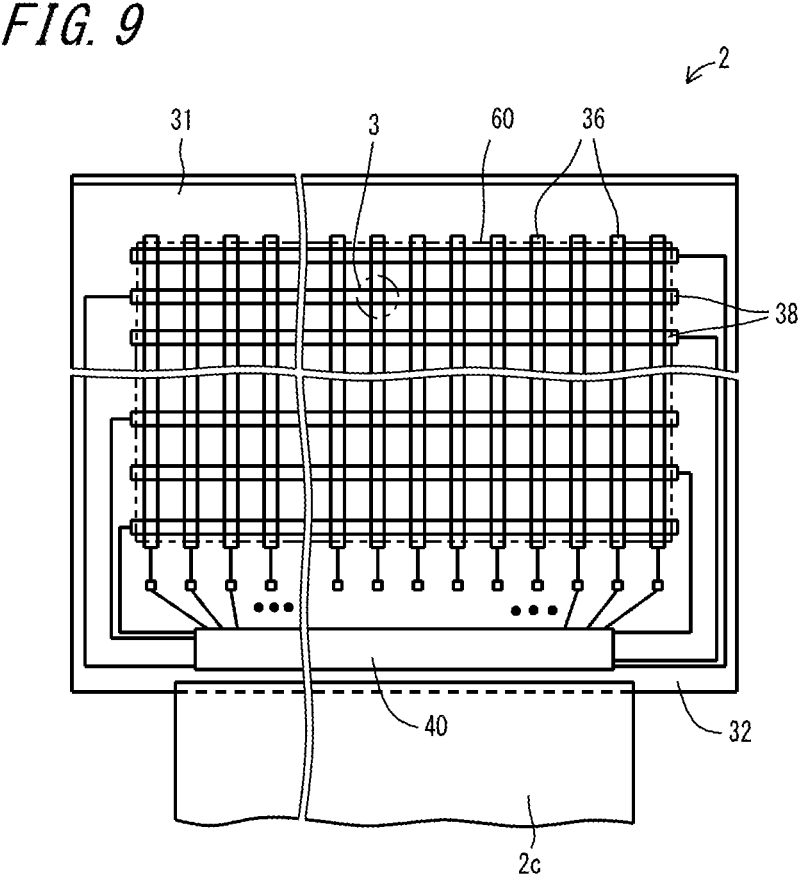
FIG. 9 is a front view showing the configuration of the passive matrix liquid crystal display panel in simplified form.

FIG. 8 is an enlarged sectional view showing part of the passive matrix liquid crystal display panel 2 and the backlight device 4, and, FIG. 9 is a front view showing the configuration of the passive matrix liquid crystal display panel 2 in simplified form. The liquid crystal display panel 2 includes a first substrate 31, a second substrate 32, a seal material 30, a liquid crystal 34, a spacer 35, a first electrode 36, an alignment film 37, a second electrode 38, a polarizer 39, and a driving circuit 40. The liquid crystal 34 is sealingly contained in a space created between the first substrate 31 and the second substrate 32 by the placement of the spacer 35, and, the seal material 30 closes the space. The first and second substrates 31 and 32 are each formed of a light-transmittable insulating substrate made of glass, polycarbonate, or acrylic resin, for example.

Figure 10:
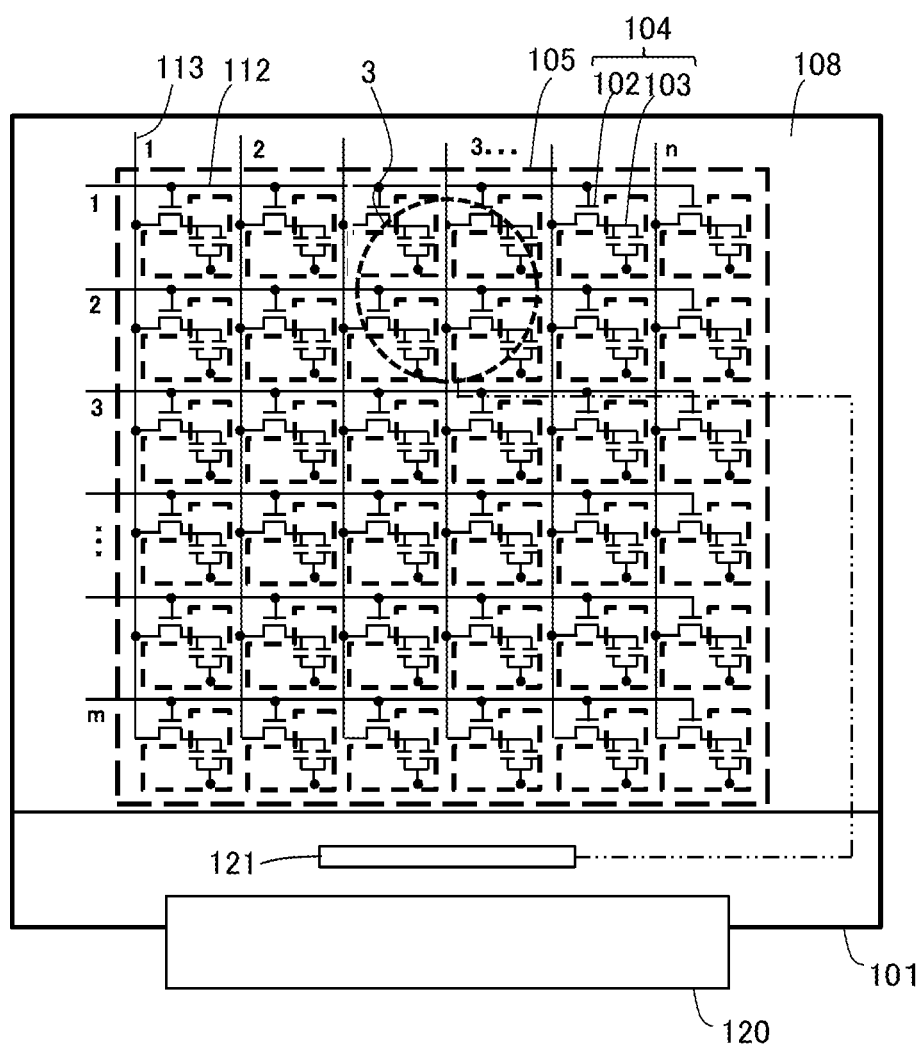
FIG. 10 is a front view showing an active matrix liquid crystal display panel in simplified form.

A plurality of vertically elongated first electrodes 36 are formed on the first substrate 31. For example, the first electrode 36 is formed of a transparent conductive thin film such as an ITO (Indium Tin Oxide) film. A plurality of horizontally elongated second electrodes 38 are formed on the second substrate 32. For example, like the first electrode 36, the second substrate 32 is formed of a transparent conductive thin film such as an ITO film. The first electrode 36 serves as a signal electrode, and the second electrode 38 serves as a scanning electrode. A pixel 41 is formed at each point of intersection of the first electrode 36 and the second electrode 38 as seen in a front view, and, a region including all of the pixels 41 is used as an effective display region 60. As the liquid crystal display panel 2, as shown in FIG. 10, it is possible to use an active matrix liquid crystal display panel in which common electrodes in solid electrode form are arranged in place of the first electrodes 36, and, TFTs 102, pixel electrodes 103, etc., which are connected to a gate signal line 112 and a source signal line 113 in a one-to-one correspondence with the individual pixels, are arranged in place of the second electrodes 38 of the second substrate 32.

The active matrix liquid crystal display panel 2 includes a CF (Color Filter) substrate 108 and a TFT substrate 101 which are disposed to face each other; a liquid crystal layer including a liquid crystal sealed between the CF substrate 108 and the TFT substrate 101; a polarizer disposed on a principal surface of the CF substrate 108 opposite to a principal surface facing the liquid crystal layer; and a polarizer disposed on a principal surface of the TFT substrate 101 opposite to a principal surface facing the liquid crystal layer. In FIG. 10, an effective image display region in the liquid crystal display panel 2 is indicated by phantom lines 105.

The CF substrate 108 includes a glass substrate; a color filter layer; a common electrode disposed to face a plurality of pixel electrodes 103 disposed in a matrix on the TFT substrate 101; and an alignment film. The color filter layer includes a red color filter, a green color filter, a blue color filter, and a black matrix. The TFT substrate 101 includes a glass substrate, an electrode layer, and an alignment film. The electrode layer includes gate signal lines 112, which are m in number (m represents a natural number of 2 or more), and source signal lines 113, which are n in number (n represents a natural number of 2 or more), that are arranged so as to cross one another at right angles as seen in a front view; an (m×n) array of TFTs 102 in which each TFT 102 is disposed at each point of intersection of the gate signal line 112 and the source signal line 113; and an (m×n) array of pixel electrodes 103 in which each pixel electrode 103 is disposed in the vicinity of the corresponding one of intersection points. The pixel electrodes 103 are arranged in a matrix with m rows and n columns, and, a region where one pixel electrode 103 is set corresponds to one pixel. Each gate signal line 112 is assigned to the corresponding one of pixel rows, and, each source signal line 113 is assigned to the corresponding one of pixel columns.

The effective display region 60 (or 105) is covered with the above-described cover panel 5. For example, where the image display apparatus 1 is implemented as a vehicle-mounted display panel, a first display portion 61 for a tachometer, a second display portion 62 for a fuel gauge, etc., and a third display portion 63 for a speedometer are formed on the cover panel 5 by screen printing or otherwise. The first to third display portions 61 to 63 are included in a display section 64. In contrasting a light-transmittable portion of the display section 64, which is a part of the display section 64 other than the colored displaying patterns (corresponding to a first light transmitting portion) with a non-display section 65 which is aligned with the imaging device 3 (corresponding to a second light transmitting portion as indicated by the diagonally shaded area in FIG. 1), then the light transmittance of the non-display section 65 is equal to only about 20 to 30% of that of the light-transmittable portion. That is, for example, the non-display section 65 is made as a blackened portion to substantially obscure the imaging device 3 when viewed through the cover panel 5 and the liquid crystal display panel 2 by an observer. Note that image taking can be performed by controlling a part of the liquid crystal display panel 2 which corresponds to the imaging device 3 so as to change to a light-transmittable state (exhibit light transmittance of about a few percents).

it is preferable that a power supply is shared by the imaging device 3 and the backlight device 4, the liquid crystal display panel 2 and the imaging device 3 are electrically connected to an operation controller and controlled so as to synchronize the display action of the liquid crystal display panel 2 and the imaging action of the imaging device 3. Moreover, the backlight device 4 may be also electrically connected to the operation controller so as to be controlled in conjunction with the liquid crystal display panel 2 and the imaging device 3. This can reduce the number of electrical wiring arrangements, simplifies the control procedure, and can be conducive to reduction in size and weight for the image display apparatus. For example, the above-described operation controller is included in the driving circuit 40 located on the second substrate 32. Alternatively, for example, the operation controller is a ROM or RAM region which stores operation control programs included in a driving element such as IC or LSI mounted on the circuit board 2c. The driving circuit or driving element including the operation controller may be disposed outside the liquid crystal display panel 2. Moreover, the driving circuit 40 may be configured to share a power supply of the liquid crystal display panel 2 and a power supply of the imaging device 3.

The non-display section 65 of the liquid crystal display panel 2 including a part corresponding to a camera window of the imaging device 3 is in no need of a display function formed of a thin-film transistor layer and a color filter layer. Thus, the thin-film transistor layer and the color filter layer may be cut in part, and, a part of the transparent thin-film transistor layer which corresponds to the position of the camera may be free of a thin-film transistor, an electrode, and other arrangement which may block light, and also a part of the color filter which corresponds to the camera position may be free of a colored filter element. This configuration eliminates the need for the liquid crystal display panel 2 and the imaging device 3 to perform mutual monitoring and regulate their own operation. Meanwhile, where a display portion including a thin-film transistor layer and a color filter layer is disposed also at the front of the imaging device 3, the operating condition of the liquid crystal display panel 2 may exert some influence on the imaging device 3. Thus, during the operation of the imaging device 3, the liquid crystal display panel 2 should be preferably controlled so as not to exert any influence on the imaging action. That is, at the time of the image taking operation of the imaging device 3, by bringing a part of the liquid crystal display panel 2 which corresponds to the position of the imaging device 3 to a light-transmittable state, it is possible to take a clear image with high sharpness. Note that the display portion including the thin-film transistor layer and the color filter layer exhibits light transmittance of a few percents, and thus no problem arises even when the display portion including the thin-film transistor layer and the color filter layer is disposed in a part of the liquid crystal display panel 2 which faces the imaging device 3 (at the front of the imaging device 3). In this case, the entire image display apparatus 1 equipped with the imaging device 3 can be made compact, lower in profile, and sturdy with facility.

The configuration thus far described not only can eliminate the need for working process to form openings in a substrate made of glass or the like but also can achieve apparatus size reduction and low-profile styling, and also can provide an image display apparatus in the form of a camera built-in display apparatus which is inexpensive, sturdy, and affords high reliability.

This configuration can be preferably used especially in an apparatus that takes images of a driver staying in a vehicle and the interior and exterior of the vehicle by using the imaging device 3, detects driver's drowsy driving and inattentive driving on the basis of the running conditions of the vehicle and driver's conditions to give warning of danger, senses an object which jumped out on the road or the area between the vehicle and the one ahead to give warning of danger if necessary, and obtains image data about driver's conditions, vehicle conditions, road conditions, etc. that is useful as circumstantial evidence in the event of an accident.

By virtue of the configuration, even when an ultrabright backlight device (set for an intensity in the order of about 20000 candela, for example) is used, it never occurs that image taking operation ends in failure due to the entry of light from the backlight device into an imaging element (such as a CMOS image sensor) of the imaging device 3.

FIG. 11 is a perspective view showing an imaging device 3a for use in an image display apparatus in accordance with another embodiment of the present disclosure. In the image display apparatus according to the present embodiment employing the imaging device 3a in place of the above-described imaging device 3, an infrared generating portion 70 for emitting infrared light is attached to the second flange 23d of the third sleeve 23. The infrared generating portion 70 is implemented by providing the second flange 23d with a plurality of infrared LEDs 71 that are equiangularly spaced apart in a circumferential direction of the second flange 23d. While twelve infrared LEDs 71 are provided in the configuration shown in FIG. 11, the infrared LEDs 71 may be about two or three in number. In this case, preferably, the infrared LEDs 71 are equiangularly spaced with respect to the center axis of the annular light shield member 30.

With the addition of the infrared generating portion 70 for enabling image taking in the dark to the imaging device 3 including the lens structure, a clear image with high sharpness can be taken even at nighttime. The infrared LED 71 is preferably configured to emit infrared light with a wavelength of 850 nm or 940 nm to allow human eyes to recognize light without hindrance, as well as to protect the eyes from damage. An infrared LED set for a wavelength of 940 nm, in particular, is safe, inexpensive, and simple in operation, and thus a diverse number of such infrared LEDs are commercially available for use in an infrared remote-control unit included with a consumer-oriented electrical appliance, for example, a cooling or/and heating appliance such as an air conditioner or a television set. Note that the infrared generating portion 70 does not necessarily have to be formed integrally with the third sleeve 23. On an as needed basis, the infrared generating portion 70 may be disposed in any suitable location inside the image display apparatus 1, or, two or more infrared generating portions 70 may be disposed in different locations. For example, the infrared generating portion 70 may be disposed in an area of the chassis 6 other than the area provided with the imaging device 3, such as a part of the liquid crystal display panel 2-side face of the chassis 6 which lies in the vicinity of the imaging device 3-bearing area. This configuration can reduce deterioration of the imaging performance of the imaging device 3 caused by the influence of heat generated in the infrared generating portion 70.

Figure 12:
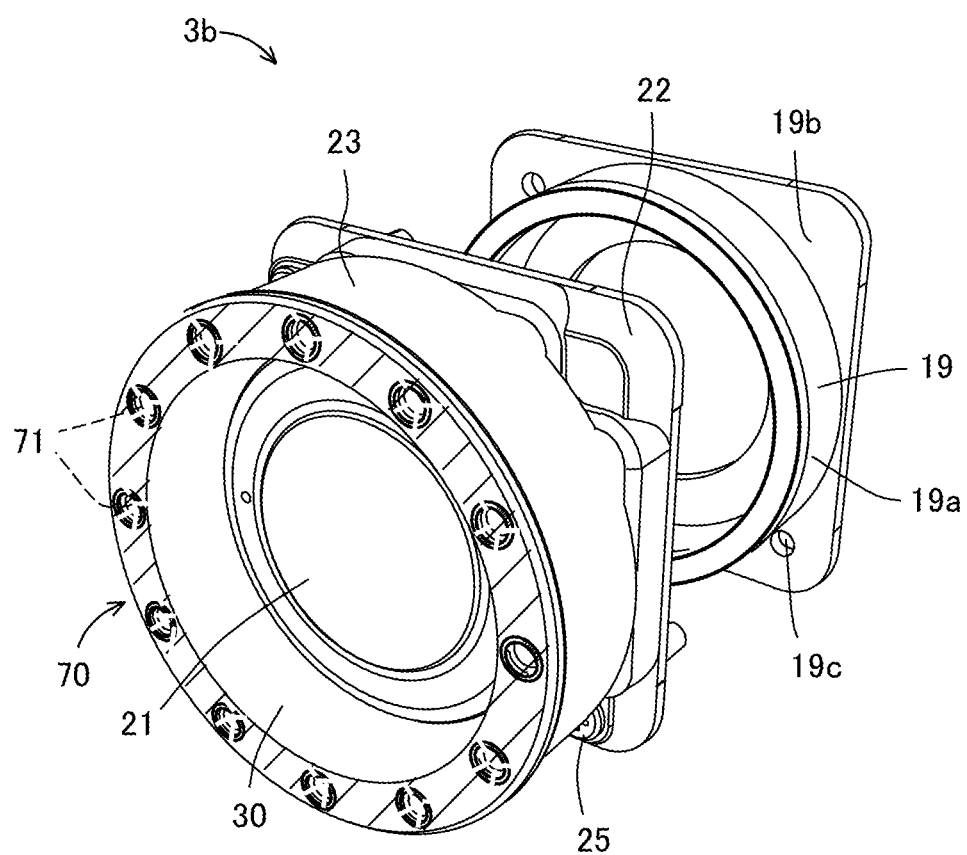
FIG. 12 is a perspective view showing the imaging device for use in the image display apparatus in accordance with another embodiment of the present disclosure.
Figure 13:
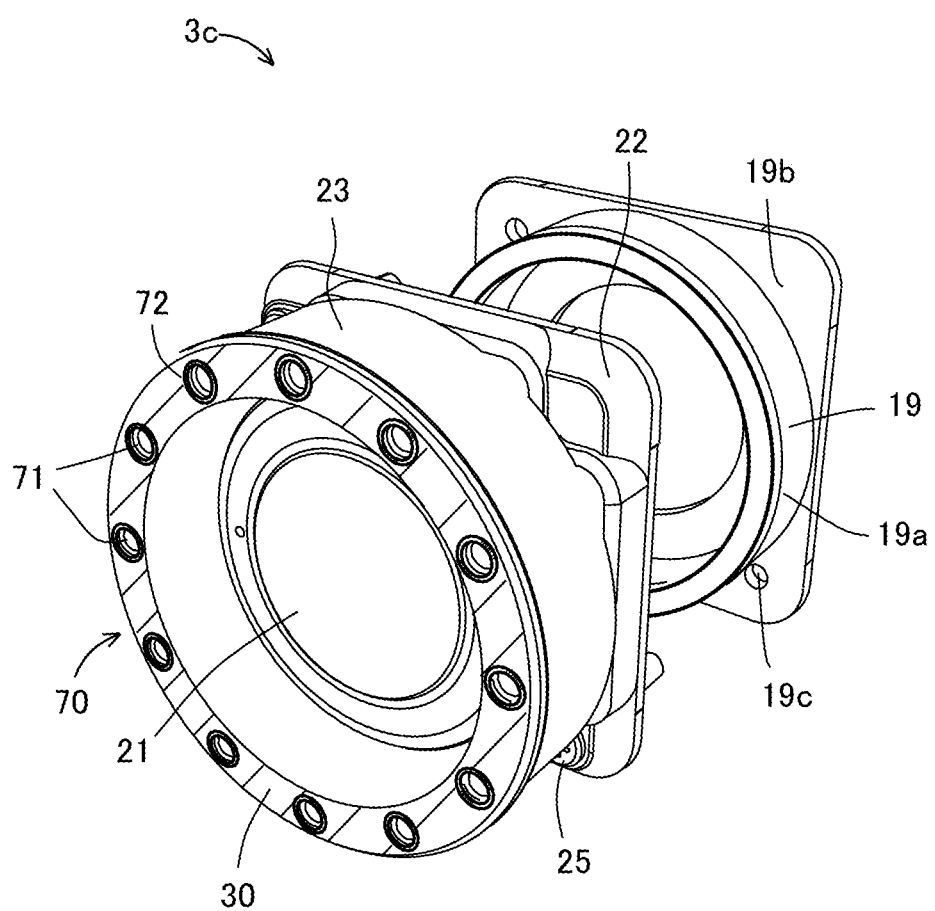
FIG. 13 is a perspective view showing the imaging device for use in the image display apparatus in accordance with another embodiment of the present disclosure.
Figure 14:
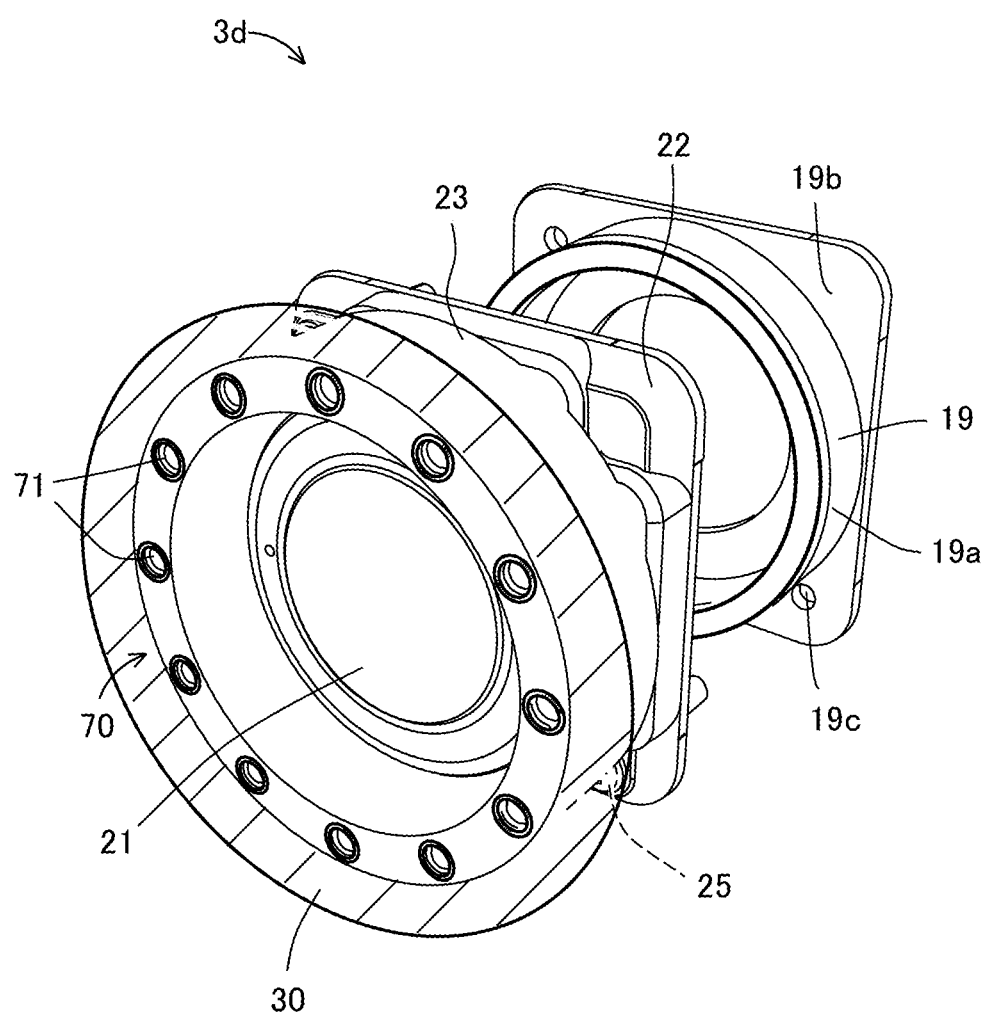
FIG. 14 is a perspective view showing the imaging device for use in the image display apparatus in accordance with another embodiment of the present disclosure.

By way of another embodiment of the present disclosure, in an imaging device 3b as shown in FIG. 12, each infrared LED 71 is covered with a light shield member 30 which is transmittable to infrared light and blocks visible light. Moreover, an imaging device 3c as shown in FIG. 13 includes a light shield member 30 provided with through holes 72 located corresponding to the infrared LEDs 71. In this case, the light shield member 30 does not necessarily have to be made of a material which transmits infrared light, and may thus be made of a material which blocks infrared light. This creates the advantage to provide greater flexibility in material selection. In addition, in an imaging device 3d as shown in FIG. 14, the second flange 23d of the third sleeve 23 is made greater in radial width than that of the configuration shown in FIG. 13, so that a light shield member 30 may be disposed around the infrared LEDs 71 at the end surface 23e of the third sleeve 23. In this case, there is no need to form the through hole 72 in the light shield member 30 to allow infrared light to pass therethrough. This creates the advantage to make easy the production of the light shield member 30.

Figure 15:
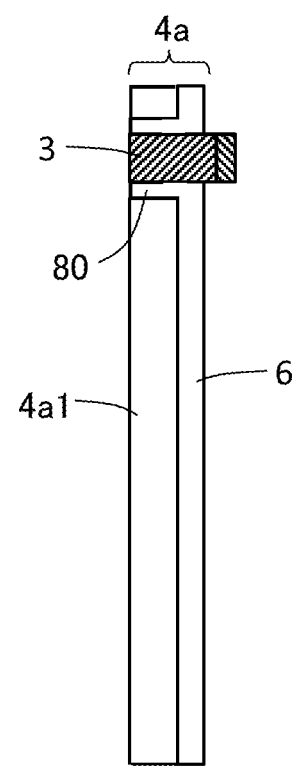
FIG. 15 is a sectional view showing the backlight device for use in the image display apparatus in accordance with another embodiment of the present disclosure.

FIG. 15 is a sectional view showing a backlight device 4a, in simplified form, for use in the image display apparatus in accordance with another embodiment of the present disclosure. In the preceding embodiment, the bolt 25 threadedly engages the projection 6d of the chassis 6 to implement retaining means for supporting the imaging device 3. In contrast, by way of another embodiment of the present disclosure, in the backlight device 4a, the retaining means is implemented by using a tubular body 80 disposed so as to surround the imaging device 3. For example, the tubular body 80 is made of metal such as Al or a resin material such as ABS (Acrylonitrile Butadiene Styrene) copolymer resin. The tubular body 80, surrounding the imaging device 3, blocks light from the backlight device 4 to prevent direct or indirect entry of the light from the backlight device 4 into the imaging device 3. Moreover, since the tubular body 80 is configured to surround the imaging device 3, the positioning of the imaging device 3 is facilitated, and it is thus possible to improve the mountability of the imaging device 3 to the backlight device 4a.

As a specific optical-interference preventive function for preventing optical interference of the light from the backlight device 4a with the imaging device 3, the tubular body 80 made of a material which is substantially non-transmittable to light, such as ABS resin, is attached to the chassis 6 of the backlight device 4a in advance. This allows the entire image display apparatus 1 to be downsized, lower in profile, and sturdy with facility. In FIG. 15, reference numeral 4a1 represents a constituent area of the backlight device 4a other than the chassis 6. The tubular body 80 is formed so as to pass through the constituent area 4a1 other than the chassis 6. The tubular body having such an optical-interference preventive function and so forth may be provided in an internal constituent component of the backlight device 4a, for example, the light guide plate 9. Moreover, without being limited to the tubular body 80, the same effects can be obtained even when a sealing material or adhesive made of a material which is substantially non-transmittable to light such as silicone resin is used.

In the present disclosure, as described above, the light shield member 30 is preferably made of an elastic material such as silicone resin (silicone rubber), urethane resin (urethane rubber), urethane foam (porous urethane rubber), or other rubbery material. Preferably, the light shield member 30 is darkly colored, for example, black-colored, dark brown-colored, brown-colored, or dark blue-colored for high light absorptivity. Moreover, the light shield member 30 is preferably made as a porous body having many recesses in a surface thereof. In this case, when the light from the backlight device 4a enters the recess, the recess absorbs the light efficiently. This imparts greater light-blocking capability to the light shield member 30. It is thus preferable that the light shield member 30 is made of a darkly colored porous material such as urethane foam having many recesses in a surface thereof.

Figure 16:
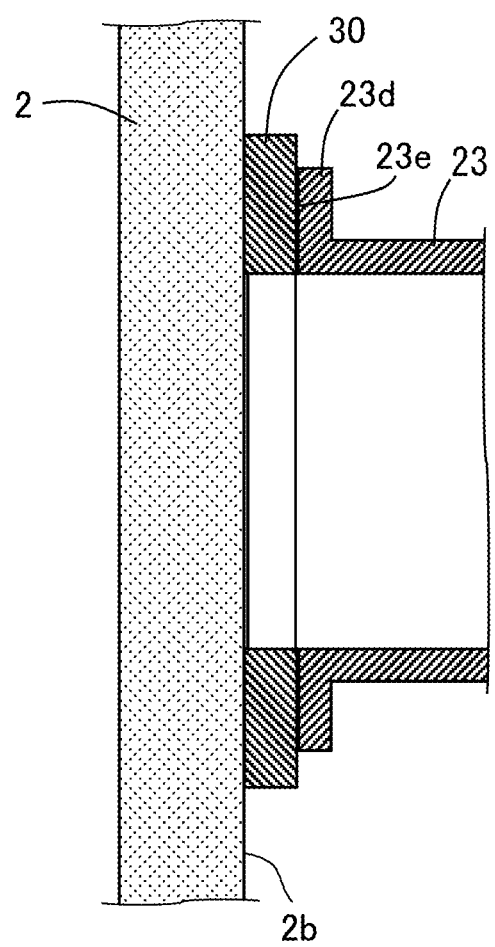
FIG. 16 is a fragmentary enlarged sectional view showing the imaging device and the liquid crystal display panel for use in the image display apparatus in accordance with another embodiment of the present disclosure.

FIG. 16 is a fragmentary enlarged sectional view showing the liquid crystal display panel 2 and the imaging device 3 in accordance with still another embodiment of the present disclosure. The same reference symbols have been used as in each preceding embodiment for like parts in the present embodiment. In the configuration shown in FIG. 16, as contrasted to the configuration shown in FIG. 4, the annular light shield member 30 is configured so that the width of an annular portion (substantial portion) thereof is greater than the width of the second flange 23d of the third sleeve 23. That is, in a front view of the annular light shield member 30, looking from the left-hand side of FIG. 16, the distance from the inner periphery of the annular light shield member 30 to the outer periphery thereof in the normal direction is longer than the distance from the inner periphery of the second flange 23d to the outer periphery thereof in the normal direction. This enhances the capability of blocking the light from the backlight device 4.

Figure 17:
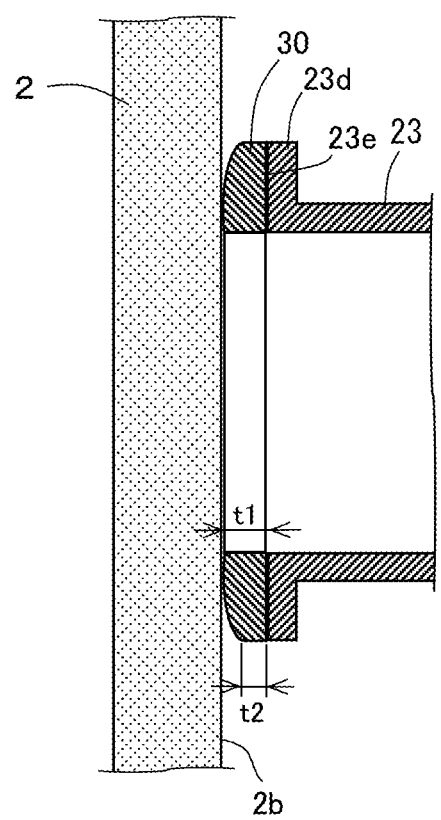
FIG. 17 is a fragmentary enlarged sectional view showing the imaging device and the liquid crystal display panel for use in the image display apparatus in accordance with another embodiment of the present disclosure.

FIG. 17 is a fragmentary enlarged sectional view showing the liquid crystal display panel 2 and the imaging device 3 in accordance with yet another embodiment of the present disclosure. The same reference symbols have been used as in each preceding embodiment for like parts in the present embodiment. In the configuration shown in FIG. 17, as contrasted to the configuration shown in FIG. 4, the annular light shield member 30 is configured so that a thickness t1 of the inner periphery of the annular portion (substantial portion) located closer to an inward diametrical plane defining the inside diameter of the annular portion is greater than a thickness t2 of the outer periphery of the annular portion located away from the inward diametrical plane. This configuration reduces the area of contact between the light shield member 30 and the second surface of the liquid crystal display panel 2, and thus, where a part of the liquid crystal display panel 2 which faces the imaging device 30 serves as a display portion, the display portion is less prone to being subjected to extra stress. In consequence, occurrence of display failure can be reduced. More preferably, a part of the light shield member 30 which makes contact with the second surface of the liquid crystal display panel 2 is made as a flat surface. In this case, the flat surface can maintain the contact, and thus, even if the contact area is reduced, the light-blocking capability can remain intact.

As seen from the foregoing, the present disclosure can afford the following advantageous effects.

The imaging device 3 is retained by the backlight device 4 in a location behind the back surface 2b of the liquid crystal display panel 2. The imaging device 3 includes the sleeve such as the tubular third sleeve 23 which retains the lens 21 therein, and also includes the annular light shield member 30 disposed between the back surface 2b of the liquid crystal display panel 2 and the end surface of the sleeve (for example, the end surface 23e of the third sleeve 23) and is in contact with each of the back surface 2b and the end surface of the sleeve. With this configuration, it is possible to avoid that light from the backlight device 4 and the resulting reflected light enter the imaging device 3 and consequently the imaging device 3 receives the light from the backlight device 4. Thus, even when image taking is performed during the time the backlight device 4 stays on, that is, the liquid crystal display panel 2 stays in an image-displaying condition, an adequate amount of light exposure is achieved, and in consequence, troubles such as image taking failure are prevented.

Thus, the imaging device 3 is retained by the backlight device 4 while being free of the entry of light from the backlight device 4. This makes it possible to eliminate the need to form a cut-out portion or through opening in a part of the liquid crystal display panel 2 which bears the TFT and the color filter to install the imaging device 3 with a consequent increase in structural complexity, and thereby accomplish the installation of the imaging device 3 with simple arrangement. Thereby, it is possible to implement the image display apparatus 1 which has excellent assemblability in manufacture by simplifying configuration, is capable of achieving size reduction and thickness reduction.

Moreover, in the case where the light shield member 30 is made of an elastic material, it is possible to enhance the adherability of the light shield member 30 to the back surface 2b of the liquid crystal display panel 2 and the end surface of the sleeve, and thereby reduce the occurrence of a gap through which light penetrates and consequently prevent the entry of light into the imaging device 3 more securely. Since the light shield member 30 is made of an elastic material, occurrence of display failure due to generation of extra stress in the liquid crystal display panel 2 is prevented.

Moreover, in the case where the light shield member 30 is fastened to the end surface of the sleeve and the light shield member 30 contacts the back surface 2b of the liquid crystal display panel 2 such that a biasing force is applied to the back surface 2b of the liquid crystal display panel 2, flexibility in movement to the light shield member 30 relative to the back surface 2b of liquid crystal display panel 2 is imparted, and occurrence of display failure due to generation of extra stress in the liquid crystal display panel 2 is prevented.

Moreover, the cover panel 5 in the form of a plate-like protective member is disposed so as to cover the display surface 2a of the liquid crystal display panel 2. This cover panel 5 includes the first light transmitting portion and the second light transmitting portion which is lower in light transmittance than the first light transmitting portion. The imaging device is aligned with the second light transmitting portion. In this case, it is possible to reduce the entry of reflected light, which results from the reflection of light from the backlight device 4 by the cover panel 5, into the imaging device 3. In addition, it is possible to obscure the imaging device 3 when viewed from outside by an observer.

Moreover, in the case where the imaging device 3 is provided with the infrared generating portion 70, it is possible to apply infrared light from the infrared generating portion 70 to the object to be photographed, and thereby enable image taking in the dark.

Moreover, in the case where the image display apparatus includes the power supply which is shared by the imaging device 3 and the backlight device 4, and the operation controller which operates the liquid crystal display panel 2 in conjunction with the imaging device 3 by inputting an operation signal of the imaging device 3 to the liquid crystal display panel 2, it is possible to implement the downsized, low-profile image display apparatus 1 equipped with the imaging device 3 in the form of a camera built-in display apparatus at low cost with facility. In addition, for example, under the control of the operation controller, a part of the liquid crystal display panel 2 which corresponds to the position of the imaging device 3 can be brought to a light-transmittable state during image taking operation of the imaging device 3. This facilitates the image taking operation.

The present disclosure relates to an image display apparatus with a built-in imaging device that finds preferable use in such widely divergent industrial fields as vehicle-mounted speed indicators and electronic equipment. The present disclosure is suitably applicable especially to various apparatuses that take images of a driver staying in a vehicle and the interior and exterior of the vehicle by using the imaging device, detect driver's drowsy driving and inattentive driving on the basis of the running conditions of the vehicle and driver's conditions to give warning of danger, sense an object which jumped out on the road or the area between the vehicle and the one ahead to give warning of danger if necessary, and obtain image data about driver's conditions, vehicle conditions, road conditions, etc. that is useful as circumstantial evidence in the event of an accident.

The present disclosure may be embodied in other specific forms without departing from the spirit or essential characteristics thereof. The present embodiments are therefore to be considered in all respects as illustrative and not restrictive, the scope of the present disclosure being indicated by the appended claims rather than by the foregoing description and all changes which come within the meaning and the range of equivalency of the claims are therefore intended to be embraced therein.

REFERENCE SIGNS LIST

1: Image display apparatus
2: Liquid crystal display panel
   2a: Display surface
   2b: Back surface
3, 3a-3c: Imaging device
4: Backlight device
5: Cover panel
6: Chassis
   6a: Bottom plate
   6b: Side wall
   6c: Protrusion
   6d: Protrusion
7: Tray
   7a: Bottom plate
   7b: Side wall
   7c: Light-emitting element
   7d: Substrate
   7e: Light-emitting element array substrate
   7f: Protrusion
8: Reflective sheet
9: Light guide plate
10: Diffusing sheet
11: Brightness enhancement film
12: Frame body
   12a: Frame portion
   12b: Slit
14: Substrate
15: Imaging element
16: Imaging element substrate
17: First lens
18: Second lens
19: First sleeve
   19a: Tubular portion
   19b: Flange
   19c: Through opening
20: Third lens
21: Fourth lens
22: Second sleeve
   22a: Tubular portion
   22b: Flange
   22c: Through opening
23: Third sleeve
   23a: Tubular portion
   23b: First flange
   23c: Through opening
   23d: Second flange
   23e: End surface 30: Light shield member
60: Effective display region
61: First display portion
62: Second display portion
63: Third display portion
64: Display section
65: Non-display section
70: Infrared generating portion

The invention claimed is:

1. An image display apparatus, comprising:
a liquid crystal display panel comprising a display surface for displaying an image on a first surface of the liquid crystal display panel;
an imaging device disposed to face a second surface of the liquid crystal display panel, the second surface located opposite to the first surface, the imaging device being capable of imaging a front area of the liquid crystal display panel and comprising
a sleeve, and
an imaging element which receives incoming light which has passed through the sleeve;
a backlight device disposed to face the second surface of the liquid crystal display panel, the backlight device applying light to the second surface of the liquid crystal display panel and including a retaining portion to hold the imaging device; and
a light shield member comprising an inner periphery portion and an outer periphery portion, the light shield member having an annular shape, being disposed between the second surface of the liquid crystal display panel and an end surface of the sleeve, and being in contact with each of the second surface and the end surface,
wherein a thickness of the inner periphery portion is a greater than a thickness of the outer periphery portion.

2. The image display apparatus according to claim 1, wherein the light shield member is made of an elastic material.

3. The image display apparatus according to claim 1, wherein the light shield member is fastened to the end surface of the sleeve and is in contact with the second surface of the liquid crystal display panel such that a biasing force is applied to the second surface of the liquid crystal display panel.

4. The image display apparatus according to claim 1, wherein the retaining portion comprises a tubular body which surrounds the imaging device.

5. The image display apparatus according to claim 1, further comprising:
a protective member, the protective member having a plate-like shape, covering the display surface of the liquid crystal display panel, and comprising a first light transmitting portion and a second light transmitting portion which is lower in light transmittance than the first light transmitting portion,
wherein the imaging device is aligned with the second light transmitting portion.

6. The image display apparatus according to claim 1, further comprising:
an infrared generating portion located in the imaging device, the infrared generating portion emitting infrared light toward the liquid crystal display panel.

7. The image display apparatus according to claim 1, further comprising:
a power supply which is shared by the imaging device and the backlight device; and
an operation controller which operates the liquid crystal display panel in conjunction with the imaging device by inputting an operation signal of the imaging device to the liquid crystal display panel.

* * * * *